(12) United States Patent
Thumpudi et al.

(10) Patent No.: US 10,200,632 B2
(45) Date of Patent: Feb. 5, 2019

(54) LOW-ILLUMINATION PHOTO CAPTURE WITH REDUCED NOISE AND BLUR

(71) Applicant: Microsoft Technology Licensing, LLC, Redmond, WA (US)

(72) Inventors: Naveen Thumpudi, Redmond, WA (US); Louis-Philippe Bourret, Seattle, WA (US); Alsisan F. Suhib, Bellevue, WA (US); Ravikant Gupta, Bellevue, WA (US); Spandan Tiwari, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/448,883

(22) Filed: Mar. 3, 2017

(65) Prior Publication Data

US 2018/0035058 A1 Feb. 1, 2018

Related U.S. Application Data

(60) Provisional application No. 62/369,706, filed on Aug. 1, 2016.

(51) Int. Cl.
| | |
|---|---|
| H04N 5/228 | (2006.01) |
| H04N 5/265 | (2006.01) |
| G06T 5/00 | (2006.01) |
| G06T 7/90 | (2017.01) |
| G06T 5/40 | (2006.01) |
| G06T 5/50 | (2006.01) |

(52) U.S. Cl.
CPC ............ *H04N 5/265* (2013.01); *G06T 5/002* (2013.01); *G06T 5/003* (2013.01); *G06T 5/40* (2013.01); *G06T 5/50* (2013.01); *G06T 7/90* (2017.01)

(58) Field of Classification Search
CPC .......... H04N 5/265; G06T 5/40; G06T 5/002; G06T 7/90
USPC ........................................ 348/222.1; 382/205
See application file for complete search history.

(56) References Cited

U.S. PATENT DOCUMENTS

| | | |
|---|---|---|
| 7,092,579 B2 | 8/2006 | Serrano et al. |
| 8,830,360 B1 | 9/2014 | Burt et al. |
| 9,049,391 B2 | 6/2015 | Venkataraman et al. |
| 9,171,355 B2 | 10/2015 | Zhuo et al. |
| 9,275,445 B2 | 3/2016 | Granados et al. |

(Continued)

OTHER PUBLICATIONS

"Take Mobile Imaging to the Next Level", Retrieved on: Jul. 8, 2016 Available at: http://www.almalence.com/embedded-imaging.

(Continued)

*Primary Examiner* — Yogesh Aggarwal
(74) *Attorney, Agent, or Firm* — Newport IP, LLC; Han Gim

(57) ABSTRACT

Techniques for combining images to reduce motion blur in an output image are described. Data indicative of a first image and a second image of a scene is received. At least one portion of the first image associated with motion blur is identified. The portion of the first image is compared to a corresponding second portion of the second image. First pixels within the at least one portion of the first image and second pixels within the second portion of the second image not associated with motion blur are selected. The selected first pixels and second pixels are combined into an output image. The combined selected pixels are rendered on a display device.

20 Claims, 7 Drawing Sheets

(56) References Cited

U.S. PATENT DOCUMENTS

| | | | |
|---|---|---|---|
| 2009/0285480 A1 | 11/2009 | Bennett et al. | |
| 2011/0211758 A1 | 9/2011 | Joshi et al. | |
| 2013/0329004 A1 | 12/2013 | Baqai et al. | |
| 2014/0232904 A1* | 8/2014 | Na | H04N 5/23229 348/239 |
| 2016/0080626 A1 | 3/2016 | Kovtun et al. | |
| 2016/0093034 A1 | 3/2016 | Beck et al. | |
| 2016/0112650 A1* | 4/2016 | Laroia | H04N 5/2257 348/239 |
| 2016/0125616 A1* | 5/2016 | Lee | G06K 9/4638 382/205 |

OTHER PUBLICATIONS

Cao, et al., "A License Plate Image Enhancement Method in Low Illumination Using BEMD", In Journal of Multimedia, vol. 7, No. 6, Dec. 2012, pp. 401-407.

He, et al., "Guided Image Filtering", IIn Proceedings of 11th European Conference on Computer Vision, Sep. 5, 2010, pp. 1-14.

Yoo, et al., Low-Light Image Enhancement Using Adaptive Digital Pixel Binning, In Journal of Sensors, vol. 15, Issue 7, Jun. 25, 2015, pp. 14917-14931.

\* cited by examiner

LOW-ILLUMINATION PHOTO CAPTURE WITH REDUCED NOISE AND BLUR

CROSS REFERENCE TO RELATED APPLICATIONS

The present invention claims benefit under 35 U.S.C. § 119(e) of U.S. provisional application No. 62/369,706, filed Aug. 1, 2016, the contents of which are hereby incorporated by reference into this disclosure in their entirety.

TECHNICAL FIELD

This disclosure relates generally to image capture and image processing, and more specifically to enhancing images captured in low-light conditions, and/or reducing noise and blur in images.

BACKGROUND

In some cases, it may be difficult to capture images in low illumination (or low-light) scenes or settings with good image quality. This may be especially true for mobile devices equipped with image sensors that typically have fixed aperture and small sensor size. This problem arises because in traditional single shot capture, a camera must increase exposure time to accommodate low light situations, which can lead to motion blur, or increase sensor gain (ISO) (with shorter exposure time) which can lead to increased noise levels in the captured image. As a result, improvements can be made in image processing techniques, particularly for low light scenarios.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Systems and techniques are described herein for improving the quality of images, particularly images captured under low-light conditions. In one aspect, pixel information may be sampled from multiple frames, for example, captured with similar exposure settings, and combined in order to reduce noise, motion blur, or both. In some aspects, the output pixel information may be spatially filtered to further reduce noise levels in the output image. The spatial filter used may provide statistical information that may further be used to sharpen and brighten parts of the image to produce a final image with improved image quality when compared with a single captured image. While this technique may significantly improve the image quality of a scene in low light conditions, it could alter image quality negatively if applied to a well illuminated scene. In order to address this problem, a custom scene analysis module or process may be used to determine an estimation of noise and lighting of the scene, as well as evaluate global and/or local motion that could prevent good alignment, the result of which may be used to determine whether to capture and apply the frame fusion and enhancement techniques to the captured frame or frames.

In one example, a two or more frame fusion technique may be implemented to reduce noise and motion blur in one or more captured images. Two or multiple frame fusion may include taking two or more images, for example, captured using similar exposure settings, and then combining the images. In one aspect, the frames may be selectively combined, such that parts of one image that have blur or noise, may be substituted and/or combined with a similar portion of the other image that does not have blur and/or noise or is associated with reduced noise and/or blur. In some aspects, weighting may be applied on a pixel basis to each image, for example, to be applied in combining the images.

In some aspects, the output of the frame fusion may be modified via a histogram-based image tone mapping technique to produce a low artifact tone matched output. The histogram-based image tone mapping technique may produce a higher quality image than traditional histogram tone mapping techniques, even for two images with very different tones.

In some aspects, edge-aware joint denoising and sharpening may be applied to an image, such as an image output from frame fusion or a single captured image, for example, using a guided filter, to reduce noise and enhance the perceived quality of the image.

In some cases, the noise level(s) in image may be determined and mapped to the strength of a spatial denoiser, applied to the image, for example in combination with a guided filter, to adaptively reduce noise in an image and/or preserve real texture in the output.

It should be appreciated that one or more of the above described techniques, as will be detailed further below, may be combined and/or implemented alone, to achieve one or more benefits described herein.

Figure 1:
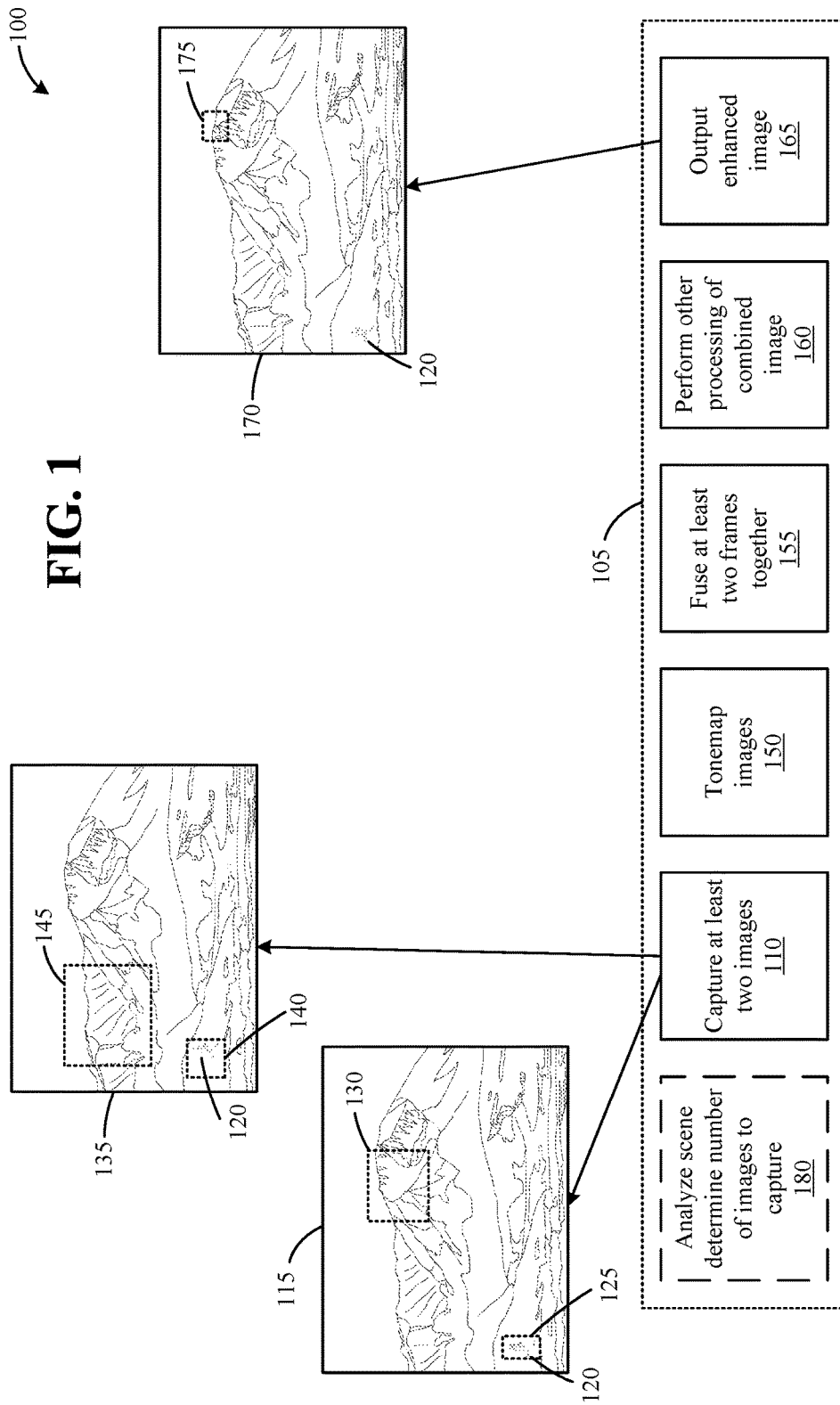
FIG. 1 depicts an example system for capturing/receiving at least two images and selectively combining the images to produce an enhanced output image.

FIG. 1 illustrates an example diagram of a system 100 for enhancing images, such as in low-light capture conditions. System 100 includes a computing device 105, which may include any of, for example, a mobile device, a smart phone, a camera or camera sensor, a display or touch screen, and/or one or more input devices. In some aspects, computing device 105 may be separated into two or more separate machines, virtual instances or resources, or combinations thereof. For example, an image capturing device, such as a camera, may be associated with a first device. An image processing device, including a processor and memory, may be associated with another device, and/or a display capable of displaying one or more images or video may be associated with a third device, for example, all in communication with each other over a communication network. In any of these above scenarios, the computing device(s) 105 may perform a number of processes to capture, enhance, combine, and/or output one or more enhanced images according to the techniques described herein.

As illustrated, device 105 may capture and/or receive at least two images 115 and 135, for example, that may be taken or associated with similar exposure metrics (e.g., aperture of the image sensor, ISO, and shutter speed), at operation 110. In some aspects, device 105 may first analyze a scene, such as via a first image of a scene or one or more frames in preview stream from the camera, to determine how many images to capture and/or will be needed to output a clear output frame, at operation 180. Images 115 and 135 may be of any scene, etc., but as illustrated, depict a person running 120 in a mountain environment. The described techniques may be used to account for blur and other imperfections of portions of the image captured/received, for example, by selectively combining portions of two images. Image 115, for example, may have a portion 125 that is associated with blur caused by motion, for example, of runner 120. Image 115 may also have distortion of portions of less than ideal clarity, for example, due to lighting conditions, such as low light, in area 130. A second image 135, which may be taken or associated with a time shortly after the capturing of image 135, may have different areas or zones of reduced clarity, distortion, or low light effects, for example. Image 135, as illustrated, is associated with motion blur in area 140 due to movement of runner 120, and distortion associated with a mountain in the background in area 145. As will be appreciated, given a variety of factors, images captured, for example, within a given time period, may have variations, and different areas of distortion, clarity reduction, etc. As will be described below in more detail, by identifying portions of blur or other quality reductions or imperfections of multiple images, the multiple images may be intelligently combined to produce a single, better quality image.

Upon receiving or capturing at least two images at operation 110, the images may be tone mapped, at operation 150. Operation 150 may include generating a histogram of the tone map of each image. Next, at operation 155, if the histograms of the at least two images are similar in values, for example above a similarly threshold, the two images may be fused or combined together at operation 155. Operation 155 may include first aligning the at least two images. Operation 155 may further include determining regions of blur and/or noise in the two images 115 and 135, such as regions or areas 125, 140, and 145. Different areas or regions (e.g., defined by an area or number of pixels) of the images 115 and 135 may be weighted, for example, based on clarity/blur and noise. Areas of the images 115 and 135 that are not affected by noise or blur may be weighted more heavily than areas associate with blur or noise. Based on the weighting pixel information from each image 115 and 135 may then be combined. Further details of image combination techniques or image fusion will be described in greater detail below, in reference to FIGS. 2 and 3.

Next, at operation 160, other image processing, such as sharpening or blurring, for example, implemented with a guided filter, may be performed on the image output from operation 155. In some aspects, adaptive noise reduction may be applied to the image output from operation 155, which may include estimating the noise level in the image and mapping it to strength of a spatial denoiser implemented in a guided filter, for example, to preserve real texture in the output. Further details of operation 160 will be described in greater detail below, in reference to FIG. 5.

Next, at operation 165, the enhanced image 170 may be output. As illustrated, operations 150-165 may generate image 170 having reduced noise in area 175 (shrunk from noise area 130 of image 115), and no visible motion blur near the area surrounding runner 120, for example. It should be appreciated that images 115, 135, and 170 are given by way of illustrative example. Other areas or regions may be affected and or improved via the described techniques. It should also be appreciated that while system 100 is described as combining two images, that a greater number of images may be combined by system 100 using a similar process.

Figure 2:
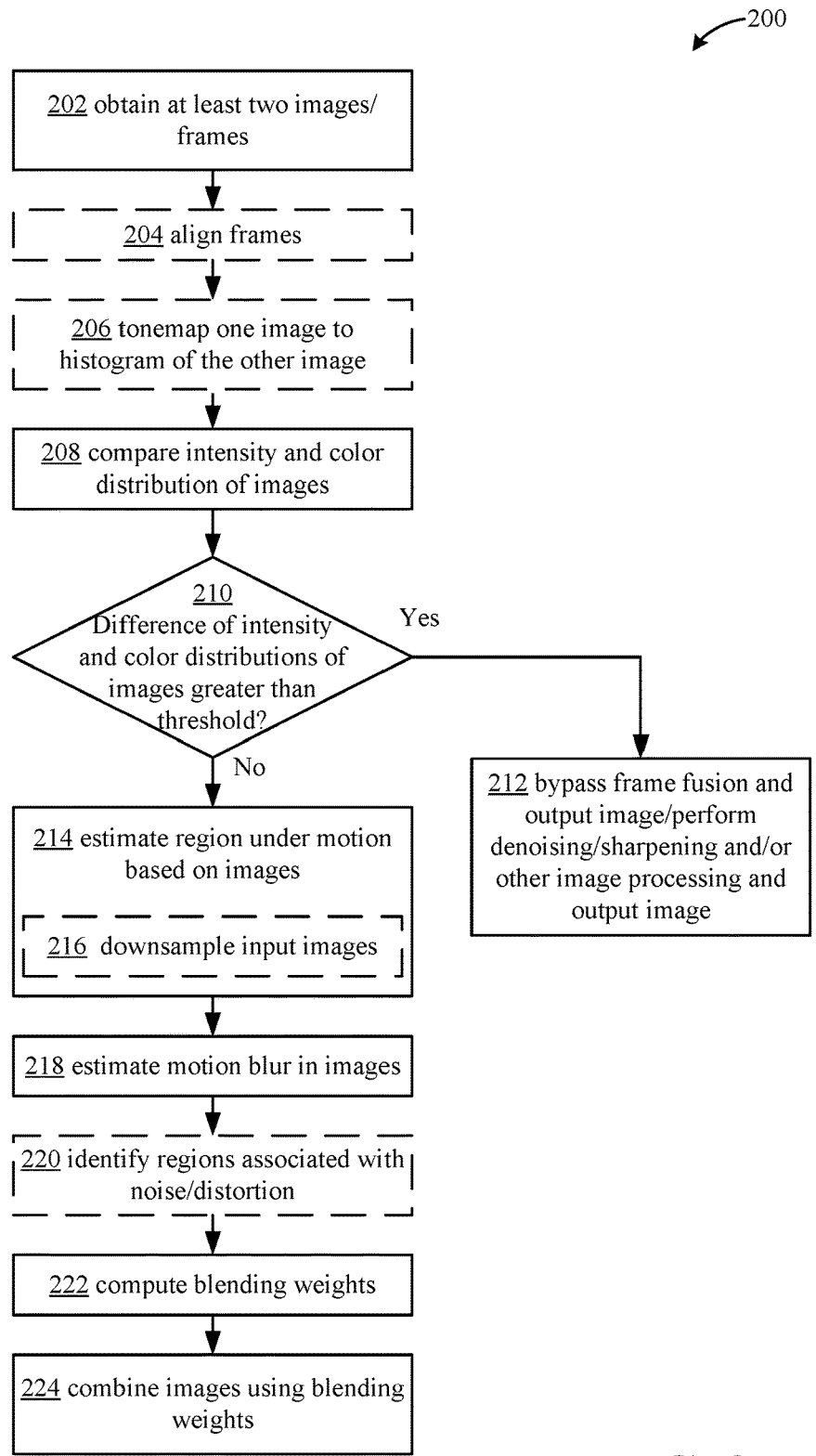
FIG. 2 depicts an example process for combining at least two images to reduce motion blur and/or account for low-light image quality degradation or noise.

FIG. 2 illustrates an example process 200 for combining at least two images to reduce motion blur and/or account for low-light image quality degradation or noise. Process 200 may be an example of operation 150 and 155, as describe above in reference to FIG. 1. Process 200 may be performed by one or more computing devices 105, for example in communication over a communication network.

As used herein, a dashed or dotted line, for example, enclosing a process block or procedure in a FIG. may be optional, such that the procedure may be added or subtracted from the overall process.

Process 200 may be implemented to merge or combine two images or frames intelligently to reduce the noise level in the output image and/or to potentially reduce motion blur by using pixels from the image that have less motion blur in the output. Process 200 begins at operation 202, where at least two images may be obtained. Process 200 may be used on both frame images having the same or similar exposure settings, such as aperture of the image sensor, ISO, and shutter speed, or images having different exposure settings. Next, at operation 204, the frames or images may be aligned. In some aspects, if the frames cannot be aligned, at least one new image may be selected or obtained, and the new combination of at least two frames may be attempted to be aligned again. This process may continue until at least two frames that are alignable are selected or obtained, or until a threshold number of tries, for example, is reached, at which point process 200 may end. In some aspects, for example, if the image sensor is on a tripod or otherwise stationary, operation 204 may be skipped in process 200. At operation 206, the at least two images may be tone mapped, for example, via any of known techniques in the art. The tone maps of the images may be represented in histogram form and compared or matched to one another (e.g., via a technique called histogram matching). The intensity and color distribution (e.g., on the pixel level) of the images may be compared at operation 208. If the difference between color and intensity values of the images is determined to differ by greater than a threshold, at operation 210, then the temporal fusion or image combination may be bypassed, at operation 212. Operation 212 may further include either outputting a single frame selected from the two or more images (for example, the image with the least amount of noise and/or blur), or performing further image processing on the image and outputting the resulting image. However, if the difference between color and intensity values of the images is determined to be smaller than the threshold (e.g., similar enough), then process 200 may proceed to operation 214, where regions under motion in the images may be estimated/identified. In some examples, operation 216 may further include down sampling the input frames to a lower resolution, such as half their resolutions, to help reducing the amount of resources (e.g., processing power, memory, time, etc.) needed for the internal computations. For each of the estimated/identified motion regions, the motion blur may be estimated at operation 218, for example, on a normalized scale. Operation 218 may include computing the aggregate gradient in each of the motion regions. Here, gradient is used as a metric for the amount of blur, such that pixels from the frame with less motion blur are used to blend in the region of the estimated motion.

In some examples of process 200, regions of the image associated with noise may be identified, at operation 220. Noise may result from low-light conditions, or other capture conditions that may affect the quality of the image captured by an image sensor or camera. Using the estimated motion blur in motion regions, and/or regions associated with noise in the images, blending weights for each image may be computed or determined at operation 222. In some aspects, the blending weights may be used to alpha blend the two frames into the final frame, for example on a pixel by pixel basis, such as RGB values. The weights may be determined such that within the area of motion only one of the frames (one with less motion blur) contributes to the final pixel value. In other aspects, the image determined to have less motion blur in the motion region may be given a greater weight based on the objective amount of blur, or based on a relative blur when compared to the same region of the other image. In some cases, outside the motion region, both the frames may contribute approximately equally to the final pixel value (e.g., the values may be averaged). In some cases, outside of the motion region(s), the images may be weighted based on noise, such that an image with less noise in a region is weighted higher than one with more noise. A smoothing change in the weights may be applied to the intermediate regions (between motion and non-motion regions) so as to mitigate any abrupt artifacts in the transition region.

Next, the images may be combined using the blending weights, at operation 224, and output as a final image, for example, for viewing on a display device, printing, etc.

Figure 3:
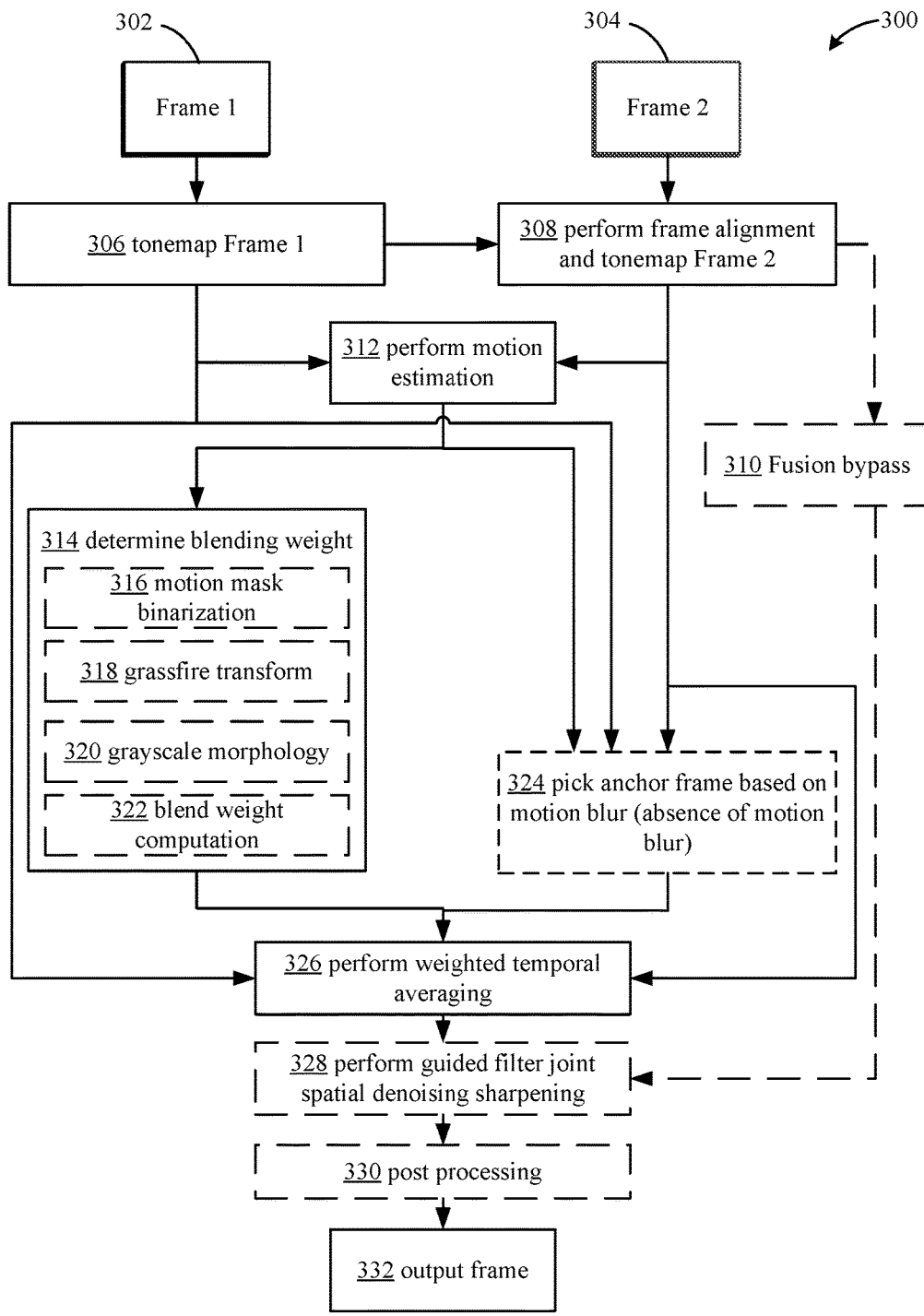
FIG. 3 depicts another example process for combining at least two images to reduce motion blur and/or account for low-light image quality degradation or noise.

FIG. 3 illustrates another example process 300 for combining at least two images to reduce motion blur and/or account for low-light image quality degradation or noise. Some aspects of process 300 may be similar to procedure described above in reference to process 200 of FIG. 2. For the sake of brevity, similar operations will not be described in great detail again here.

Process 300 may be implemented to merge or combine two images or frames intelligently to reduce the noise level in the output image and/or to potentially reduce motion blur. Process 300 begins at operation 302, where at least two frames 302, 304 may be obtained with each image having the same or similar exposure settings. At operation 306, frame 302 may be tone mapped, and at operation 308, frame 304 may be tone mapped and aligned to frame 302. The tone maps of frames 302, 304 may be represented in histogram form and compared or matched to one another (e.g., via a technique called histogram matching). Operation 308 may further include comparing the intensity and color distribution (e.g., on the pixel level), or other pixel information of the frames 302 and 304. If the difference between the frames is determined to differ by greater than a threshold, then the temporal fusion or image combination may be bypassed, at operation 310. A more detailed process for determining when to bypass the frame fusion operations will be described in greater detail with reference to FIG. 4 below. If the frame fusion operations are bypassed at operation 310, then process 300 may continue to operations 328 and 330, where guided filter techniques and or other post processing may be applied to a single frame (e.g., selected from frames 302 and 304, based on noise and/or motion blur), and the resulting frame output at operation 332.

However, if the difference between the frames 302 and 304 is determined to be smaller than the threshold (e.g., similar enough), then process 300 may proceed to operation 312, where regions under motion in each of the frames 302 and 304 may be estimated/identified. In some examples, operation 312 may further include down sampling the input frames to a lower resolution, such as half their resolutions, to help reducing the amount of resources (e.g., processing power, memory, time, etc.) needed for the internal computations.

Next, at operation 314, the blending weights that will be used to fuse the two frames may be determined. From a high level, operation 314 may determine from which of frames 302 and 304, each pixel of the output frame comes from, or to what degree each pixel from each frame 302 and 304 contributes to the output frame, in motion regions of frames 302 and 304. In some aspects, operation 314 may include one or more of the following additional operations. A motion mask corresponding to the identified/estimated motion regions in each of frames 302 and 304 may be binarized, at operation 316. In some cases, operation 316 may include excluding maximum and minimum values of the motion mask and then averaging the remaining values. To ensure more seamless blending of the two frames 302 and 304, a buffer zone may be allocated around or surrounding the boundaries of the motion regions where the blending weights taper off. Additionally, a guard zone may be allocated around the motion mask as a buffer to accommodate any misses or mis-estimations around the motion boundaries. Both of these operations may be accomplished by first applying a Grassfire transform, Manhattan distance transform, or other transform or computation of the distance from a pixel to the border of a region, at operation 318, on the input image, followed by a distance thresholding operation on the output to mark the guard zone. Operation 314 may also include performing grayscale morphology on each frame, for example, after the Grassfire transform has been applied to the frame, at operation 320. Grayscale morphology may be used at operation 320 to dilate and/or erode certain aspects of the motion mask between frames 302 and 304, for example, to improve image clarity and to account for motion blur. This operation may be followed by computing smooth blending weights using the distance values from the Grassfire transform, at operation 322.

Using the motion mask, which may be generated by operation 312, portions of frames 302 and 304 not associated with motion or motion blur may be selected at operation 324, for example, based on at least one clarity metric (e.g., lack of blur, noise, a certain level of luminance, brightness, etc.). Operation 324 may be described as selecting an anchor frame based on motion blur or the absence of motion blur. The best portions of frames 302 and 304 may be selected at operation 324 to yield the best, highest clarity, output image. Operation 324 may include computing the aggregate gradient in the motion mask bounds. Here, the gradient may be used as a metric for the amount of blur, and pixels from the frame with less motion blur may be used to blend in the region within the motion mask.

Next, using the determined blending weights and motion blur estimates for each frame 302 and 304, the frames 302 and 304 may be alpha blended into the final frame, at operation 326. In some aspects, the blending weights and motion estimates may be used to blend the two frames into the final frame, for example on a pixel by pixel basis, such as via RGB values. The weights may be determined such that within the area of motion only one of the frames (one with less motion blur) contributes to the final pixel value. In other aspects, the image determined to have less motion blur in the motion region may be given a greater weight based on the objective amount of blur, or based on a relative blur when compared to the same region of the other image. In some cases, outside the motion region, both the frames may contribute approximately equally to the final pixel value (e.g., the values may be averaged). In some cases, outside of the motion region(s), the images may be weighted based on noise, such that an image with less noise in a region is weighted higher than one with more noise. A smoothing change in the weights may be applied to the intermediate regions (between motion and non-motion regions) so as to mitigate any abrupt artifacts in the transition region.

The output of operation 326 will be a single frame. This single frame may then, in some examples, go through a guided filter spatial denoising/sharpening operation, at operation 328, and/or other post processing at 330, and be output at operation 332. An example guided filter spatial denoising/sharpening technique will be described below in greater detail in reference to FIG. 5.

Figure 4:
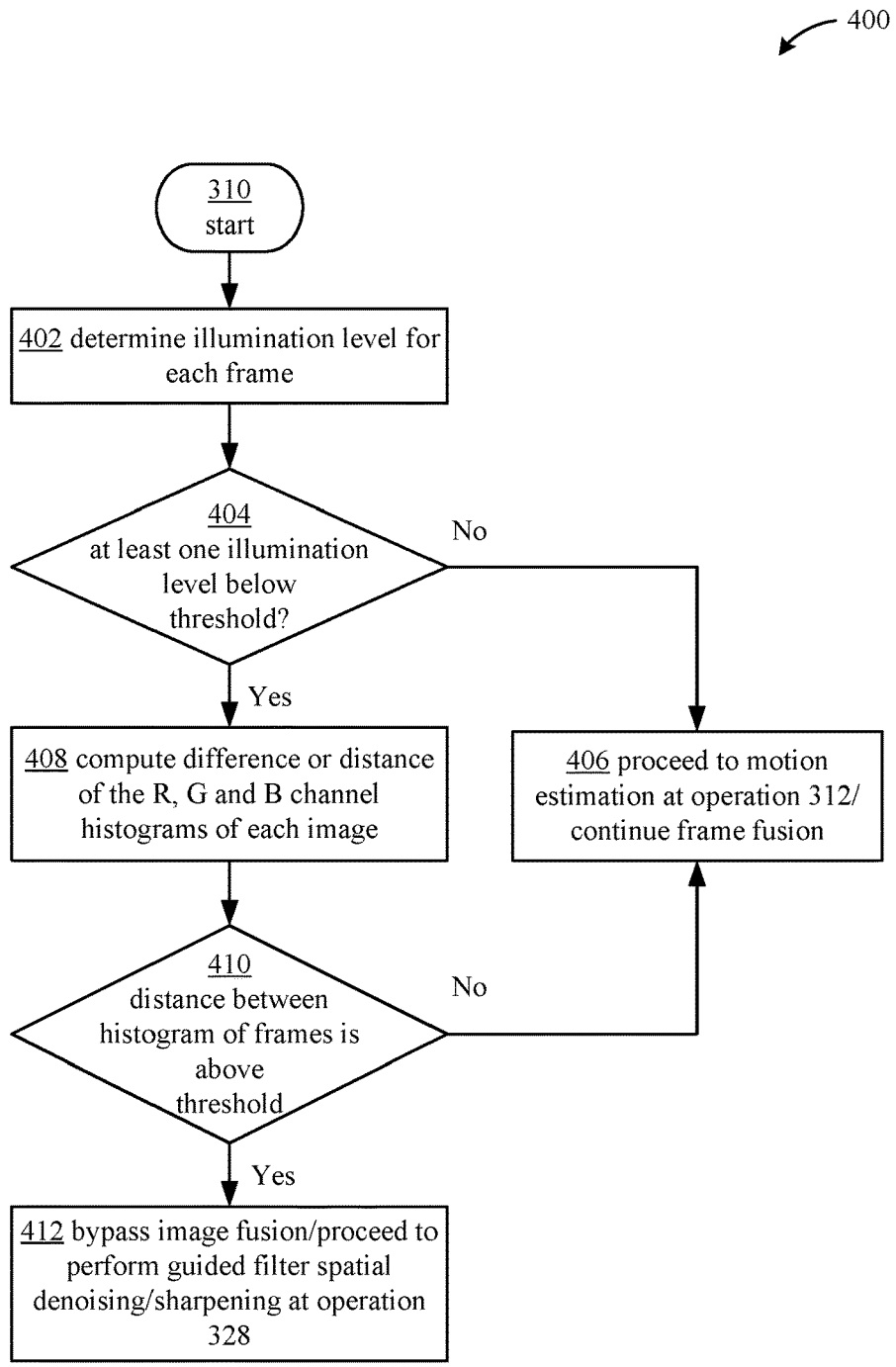
FIG. 4 depicts an example process for determining when to apply the process of FIG. 3 to at least two images.

FIG. 4 illustrates an example process 400 for determining when to apply the frame fusion or image combination procedures of process 300 of FIG. 3 to at least two images. Process 400 may be referred to herein as fusion bypass, and may be an example of operation 310 of process 300.

Early on in the process of combining frames, for example, after the frames have been aligned and tone mapped, one to match the other, it may be determined if the frames are viable for fusion. When the histograms of the frames to be combined are very different, especially in the ultra-low-light images, the output of fusion can have artifacts. In order to address this problem, a custom scene analysis module or process 400 may be used to determine an estimation of noise and lighting of the scene through computation of spatial metrics, for example, to determine if the low-illumination processing is required. In some aspects, the spatial metrics may be determined from a preview stream combined with statistics from an ISP module on the device.

Process 400 may begin with determining the illumination level for each frame to be combined, at operation 402. Next, it may be determined if the illumination level of the frames is below a threshold level, at operation 404. If the illumination levels of the frames are not below the threshold level, the frame fusion procedures of process 300 may be resumed or carried out, at operation 406. In this case, process 400 may end, and process 300 may continue at operation 312. If the illumination level of the frames is below the threshold level, the distance or difference may be computed on the R, G and B channel histograms of the two images at, operation 408. In some aspects, operation 408 may include computing the Bhattacharya coefficient or other metric of the difference between the different channels of the images or frames. Next, at operation 410, it may be determined if the distance between histograms of the frames is above a threshold. If any of the histograms have high value of this metric (e.g., a positive determination at operation 410), i.e. the two frames' distributions are different enough, process 400 may continue to operation 412, where image fusion may be bypassed and process 400 may end. Upon bypassing image fusion, for example, when process 400 is carried out as part of process 300, process 300 may return to operations 328 and/or 330, where sharpening, blurring, or post processing may be applied to the image before it is output at operation 330.

If, at operation 410, the histogram contributions between the frames do not differ by the threshold value, process 400 may proceed to operation 406, where frame fusion may be continued.

In some embodiments, the described frame fusion techniques may be cascaded to fuse more than two frames. For example, the described techniques may be cascaded so that the output of one fusion process may be input to another fusion process with additional frames selected as described. By using a cascaded process, 4, 6, 8, or more frames may be combined using the described techniques.

Figure 5:
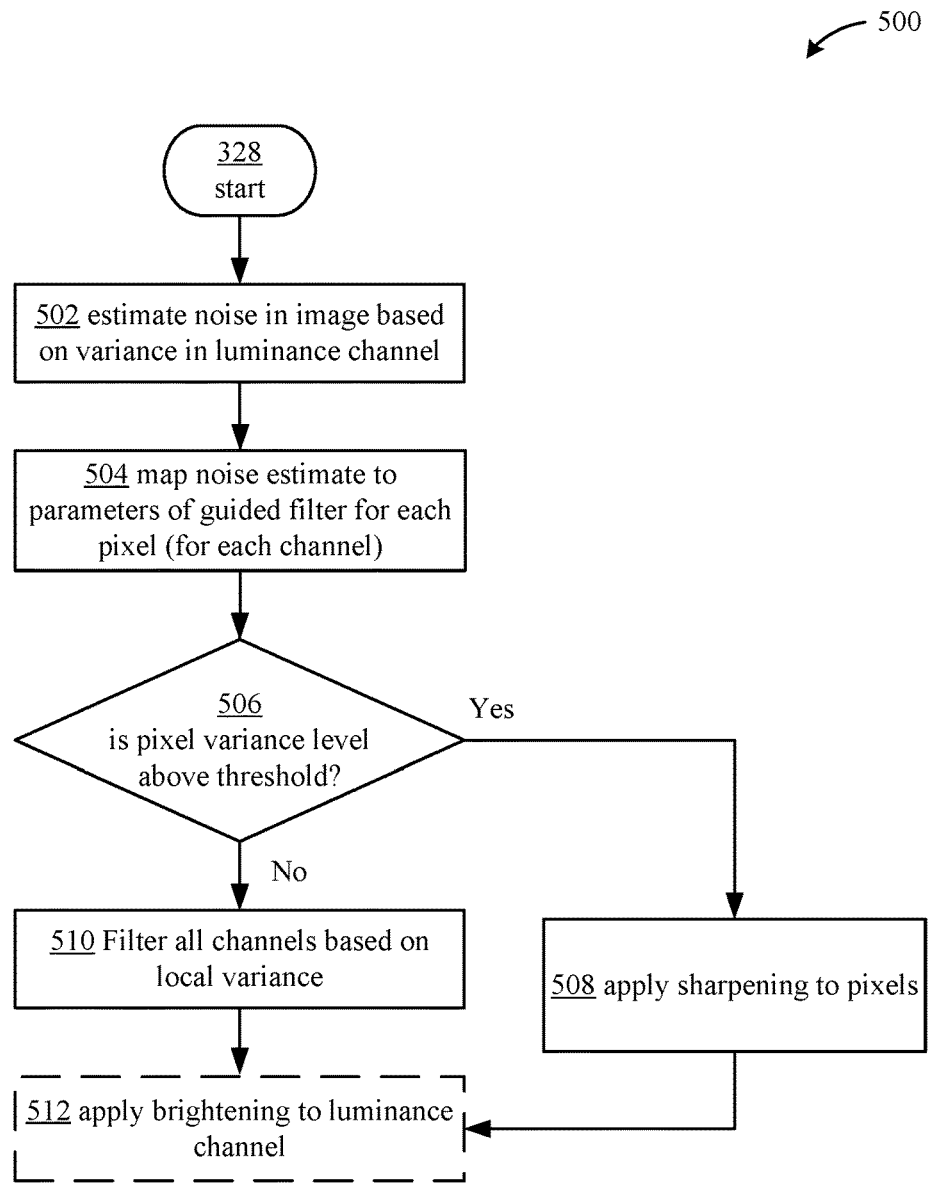
FIG. 5 depicts an example process for applying de-noising and/or sharpening to an image using guided filter.

FIG. 5 illustrates an example process 500 for applying edge-aware denoising and/or sharpening to an image using a guided filter. Process 500 may be an example of operation 320 of process 300 of FIG. 3. In some aspects, process 500 may be applied to any single image, for example, to enhance the visual qualities of the image. For example, process 500 may be implemented as a standalone process, not requiring the frame fusion of processes 200 and/or 300 to produce an enhanced image.

As generally known, a guided filter may apply a linear transform to a first image based on a guidance image, where the guidance image may be the first image or another image. In some aspects, the described techniques may be implemented in combination with one or more other image processing or filtering techniques, such as guided filter, as described by He et al., "Guided Image Filtering," retrieved at <<http://research.microsoft.com/en-us/um/people/jiansun/papers/GuidedFilter-ECCV10.pdf>>, Lecture Notes in Computer Science, 2010, vol. 6311/2010, 14 pages.

In some aspects, the result of the frame fusion may be used as an input for process 500. All the processing in this stage may be performed in the RGB, YUV domain or based on luminance (e.g., NV12, which may also be the format of the input received) due to the fact that there is generally more chrominance noise, and the chrominance noise is more difficult to deal with. As a result, chrominance channels can be subjected to stronger de-noising than the luminance channel. While luminance is described as being used for noise estimation, chrominance or chrominance and luminance values could be used. The luminance channel may be used over the chrominance channel as the chrominance channel has a lower overall energy, and thus the deviations in the energy that correspond to noise are harder to detect.

Process 500 may begin at operation 502, where the noise based on variance in the luminance channel may be estimated. The basic idea behind noise estimation is that the contribution in variance in plain surfaces in the image must, or most likely, come from underlying noise. Based on this relationship, plain surfaces (blocks) may be identified in the luminance plane and the sum of the variance for those blocks determined. The noise estimate may then be mapped to one or more parameters of the filter to be applied to the image, such as a guided filter, at operation 504. In some aspects, operation 504 may include mapping the variance to a noise level in the range 0 to 1 (both included), at operation 504. In one example, non-overlapping blocks of size 64*64 pixels may be used in the noise estimation process.

Next, at operation 506, it may be determined if the pixel variance in each of the blocks is above a threshold (e.g., operation 506 may be performed for each block identified in the image). Any block whose maximum pixel level difference between any two pixels is less than a certain threshold (e.g., a negative determination at operation 506), is considered to be a plain block. In this scenario, the YUV (or RGB) channels may be blurred, at operation 510, based on the local variance at that point (e.g., based on the variance map generated by operation 504).

In some aspects, the noise estimation operation may be performed via multi-threaded processing and the variance may similarly be computed in multiple threads in parallel for multiple separate vertical panels in the luminance image. The mapping of noise to one or more parameters (variance)

of the guided filter may be based on experimentation on sample images. Essentially the maximum variance (and any value beyond it) (e.g., found experimentally), may be mapped to a noise level of 1. The lower variance bound is taken to be zero. The exact constants are shown in the equation below:

Noise=(Min((AverageBlockVariance)/(12),1),0)

In one aspect, a single channel fast guided filter may be applied at operation 510 on the YUV planes by choosing the guidance image as the input image itself. One implementation of guided filter may include optimization to not calculate covariance between the guidance image and the input image since the covariance equals variance for this scenario. This algorithm has two parameters, details of which are explained below.

1. Epsilon (e)—This parameter essentially controls the amount of smoothing that will be applied to the image. Epsilon may be chosen by a mapping of noise level based on experimentation. An example noise mapping technique is provided below:

$$\sqrt{e}=\text{Sigma}=0.007f+0.02f*(\text{Noise}-0.166667f)*0.5f*(1.0f+\log(1.0f+(\text{Noise}-0.166667f))/\log(2.0f));$$

First of all, there is a base epsilon level of 0.007, since at such epsilon levels the effect of guided filter is nearly negligible. As a result, having a linear relationship with a lower or zero offset doesn't make sense. The slope of increase is 0.02. The remainder of the product roughly goes from 0 to 1 and follows a curve similar to $x^2$ but is less steep. This behavior was chosen, because, based on experimentation, it is desirable to have sigma increase slowly in the beginning but not as slowly as $x^2$. The offset of 0.166667 is an experimental residue from adjustment of constants.

2. Radius (r)—guided filter is a local algorithm in the sense that the output value of a pixel only depends on a square sized block around the pixel. The radius of the block is defined by this parameter. The radius chosen may be max (2, 0.5% of the min(width, height)). This value may also be selected based on experimentation. Because this parameter has less effect on the final output, less experimentation may be required to determine this parameter when compared to epsilon. It should be appreciated that the above numbers for certain variables are only given by way of example. Other values, for example, determined based on further experimentation or changes in desired output are contemplated herein.

The output pixel value is governed by the following formulas:

$$O(x,y)=A(x,y)*I(x,y)+(1-A(x,y))*M(x,y), \quad \text{(Equation 1)}$$

$$A(x,y)=A'(x,y) \text{ (if } A'(x,y)<0.5) \text{ else } \min((A'(x,y)-0.19)*1.6,1.2), \quad \text{(Equation 2)}$$

$$A'(x,y)=\text{Var}(x,y)/(\text{Var}(x,y)+e), \quad \text{(Equation 3)},$$

where:
Var(x, y) is the variance for a window of radius r centered at (x, y);
M(x, y) is the mean for a window of radius r centered at (x, y);
I(x,y) is the pixel value at (x, y);
O(x,y) is the output pixel value at (x, y);
e is the parameter epsilon explained above.

Each pixel's output is a weighted sum of the input signal and the mean signal. The weight is governed based on the variance and the parameter epsilon. If the ratio of epsilon/variance>>1, then the output is predominated by the mean signal. If epsilon/variance ~=0, then the output is predominated by the input signal. Thus, the value for epsilon was chosen such that the ratio of epsilon/variance is nearly zero for the texture in the image but is small enough for noise. A fundamental issue with this approach is that it is possible there is no value for epsilon for which the ratio epsilon/variance can effectively (in terms of removing noise) discriminate between texture and noise.

As illustrated above, a deviation from the plain guided filter in equation (2) above includes a modification to the intermediate value A'(x, y). This step is done for two reasons. The first one being that a piecewise linear relationship between A'(x, y) and the amount of blurring desired and A'(x, y), is effectively a number between 0 and 1 indicating confidence level of this point belonging to texture or not. A smaller value implies a higher confidence level that it is not texture, and vice-versa. By making the relationship between A'(x, y) and the eventual blurring done piecewise linear, an additional check is added to ensure blurring is not performed for useful details in the image. The second use of this procedure includes sharpening, which will be described in greater detail below.

In one example, the guided filter implementation may be both multi-threaded and paneled. Each frame may be divided into 4 panels. This yields 12 tasks since there are 3 frames (Y, U, and V). Each task is executed on a thread when the thread is free. The number of threads may be decided based on the number of CPU cores available on the device (s). In some aspects, the implementation may utilize SSE/Neon optimization. Any image processing framework optimized with SSE/Neon instructions can be used. sigma value used for the U, V planes may be the value used for luminance plane multiplied by a factor of $\sqrt{2}$.

Retuning back to process 500, if, at operation 506, the pixel variations in a block (performed for each block) are above the variance level threshold, then process 500 may proceed to operation 508, where sharpening may be applied to one or more pixels in the block. Sharpening, at operation 508, may be performed by a modified guided filter based on equation (2) above. According to equation (2), the value of final A(x, y) becomes greater than 1 at a value of A'=0.8. Thus beyond this point, the final output value starts adding input signal and subtracting mean signal. This may be referred to as Un-Sharp Masking, a technique for sharpening. The addition of the input signal and the subtraction of mean signal may be capped to a maximum of 20% based on experimentation. This form of sharpening provides benefits, such as: 1) no additional computation is needed as part of the de-noising process, and 2) the problem of sharpening regions which do not correspond to fine details (the low frequency components of the image), may be avoided.

After operations 510 and/or 508 have been performed for the blocks of the image, brightening may be applied, for example, to the luminance channel of the image, at operation 512. The image may be considered for brightening based on the histogram-based low-light metric (LowLightMetric), which computes how bright a scene is and the noise level in the input frames. Brightening may be applied conservatively, in that only the very dark frames that have undergone significant denoising may undergo brightening. Brightening may be applied through gamma correction, where the gamma value is chosen separately for each set based on the two parameters mentioned above. The brightening transform may be folded in with one of the final float-to-byte conversions within guided filtering, for maximum efficiency and minimal impact on performance due to brightening.

In some aspects, the guided filter may be modified in a number of ways. First, the additional averaging of constants "A" and "B," which is a part of guided filter, may be removed. This change may save some computational cycles and may have an acceptable effect on the results, for example, in terms of decreases in quality of the output image. Second, the memory usage by guided filter can be reduced by copying the overlapped region of panels separately, thus saving the need to maintain one additional set of buffers.

In some aspects, a multi-channel guided filter may be used, which uses all the three channels of the guidance image to generate output for each channel in the output image. Multi-channel guided filter may be implemented in scenarios where a higher quality of the output image is desired, and slower processing time is acceptable.

Figure 6:
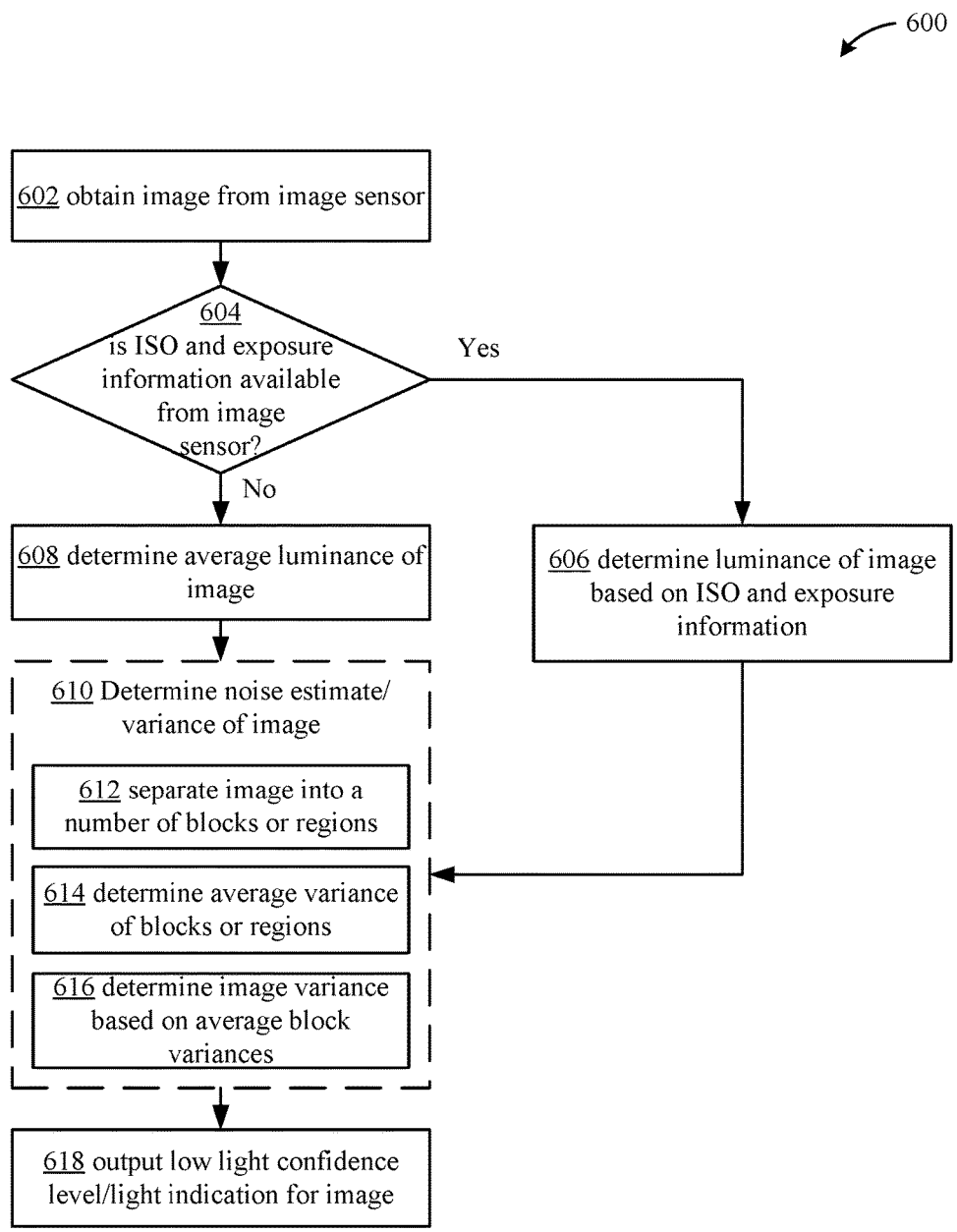
FIG. 6 depicts an example process for determining noise and light level of an image.

FIG. 6 illustrates an example process for determining noise and light level of an image. Process 600, in some cases, may be implemented as a strand alone process, or in conjunction with one or more aspects of processes 200, 300, 400, and/or 500, as described above.

Process 600 may begin at operation 602, where at least one image may be obtained from an image sensor or other source. Next, at operation 604, it may be determined if ISO and exposure information is available from the image sensor. If this determination is positive, process 600 may continue to operation 606, where the luminance of the image may be determined based on the ISO and exposure information. Process 600 may then end at operation 610, where the variance/noise of the image may be estimated or determined.

If the ISO and exposure information from the image sensor associated with the image is not available, as determined at operation 604, process 600 may proceed to operation 608, where the average luminance of the image may be determined. Operation 608 may include obtaining and averaging the luminance value of each pixel of the image, or a sample or subset of the pixels of the image. Next, at operation 610, the noise/variance in the image may be estimated or determined. Operation 610 may include separating the image into a number of blocks or regions, such as an area containing 64×64 pixels, or other number, shape, etc., at operation 612. At operation 614, the average variance of each block or region may be determined. Using each block's average variance, the total image variance may be determined at operation 616. The image variance, estimated or determined at operation 610, and the light level or luminance of the image determined at operation 606 or 608, may then be used to determine and output an indication of the level of light in the image, at operation 618. In some aspects, the low light indication/light level indication may include a confidence value between 0 and 1, with 1 indicating a low illumination level (e.g. below a threshold), and 0 indicating a bright image.

In some aspects, process 600 may be performed on a device equipped with an image sensor, such as a smart phone, tablet, or a dedicated camera, such as a DSLR camera and the like. Based on the determination of process 600, frame fusion and/or guided filter processes 200, 300, and/or 500, or other operations, may then be applied to the image.

While burst image capture was contemplated as s solution to the low-light image capture problem, it presented a number of downsides. Those downsides include, higher noise in the burst of frames (generally 5-8 frames), while generally lower motion blur, due to short exposure, which typically requires boosting the ISO, especially in low-light conditions; capture time for the burst can potentially be long; longer processing time due to operations being performed on a sequence of frames (e.g., 300 ms per frame, which yields 2.1 s for alignment alone); color desaturation due to high ISO; chrominance noise mitigation (more useful in the burst context) is less effective than luma (or luminance) noise mitigation; and complications due to reference frame selection. As a result, frame fusion was chosen because it did not present these additional issues.

In some aspects, automatable objective image quality metrics may be used to compare output image quality to an exposure value (EV), such as EV0, for example, to optimize the processes described above. Note that no single input/output pair is particularly important but the trend across a large test set may inform the development and tuning process. The following parameters may be used to fine tune and modify the processes described above to better enhance images according to the described techniques:

1) Blur comparison: output should not be more blurred than standard reference photo;
2) Motion blur in the fused output frame should be less as compared to the long exposure frame.
3) Noise Comparison: output should have less noise than the short exposure frame in all or each pixel component channel of the pixel domain chosen for processing (i.e. luma and chroma, red-green-blue).
4) Sharpness Comparison in all or each pixel component channel of the pixel domain chosen for processing (i.e. luma and chroma, red-green-blue)
5) Contrast Comparison in all or each pixel component channel of the pixel domain chosen for processing (i.e. luma and chroma, red-green-blue)

Figure 7:
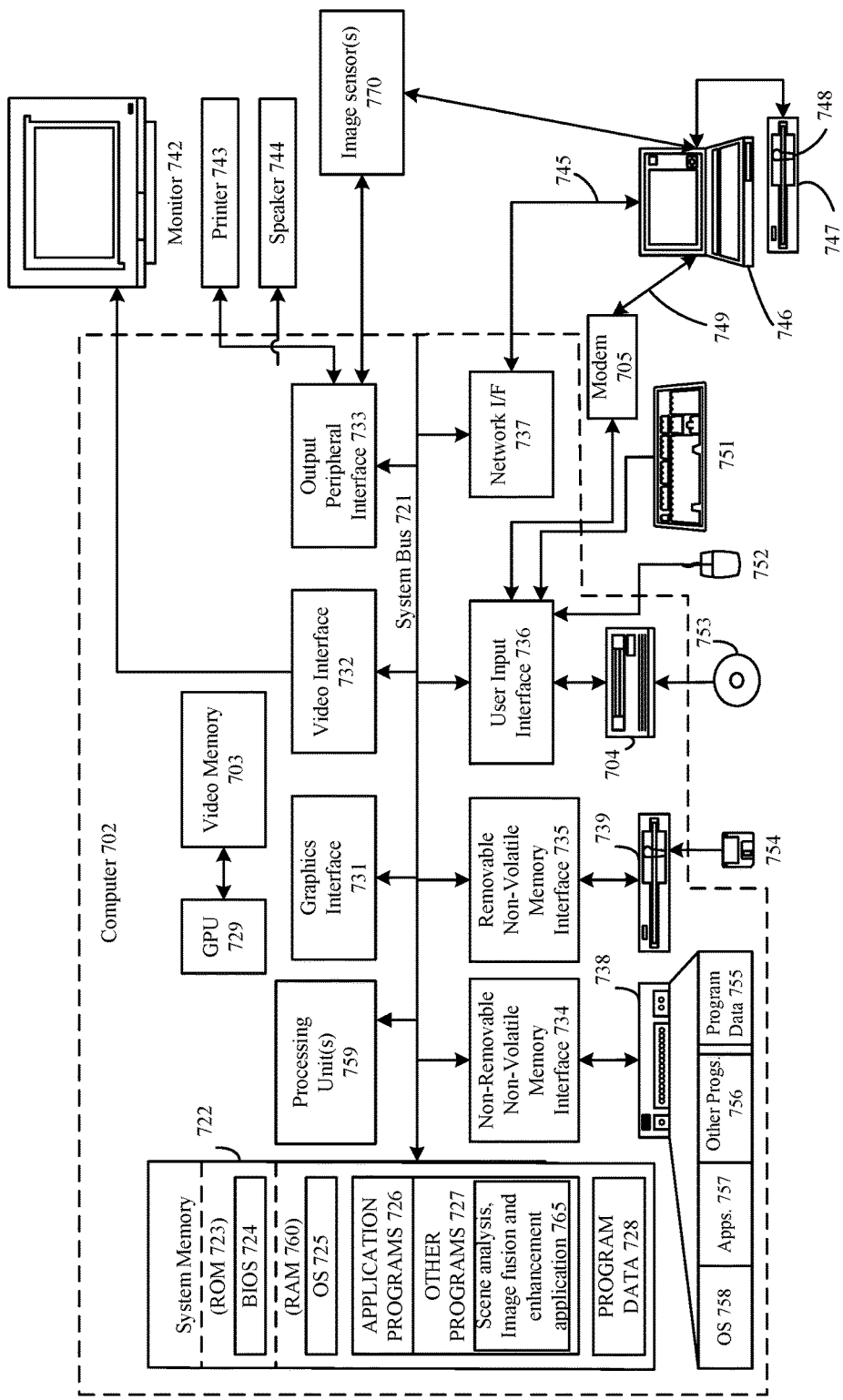
FIG. 7 depicts an example general purpose computing environment in which the techniques described herein may be embodied.

The image processing and enhancement techniques described above, including system 100, device 105, and/or processes 200, 300, 400, 500, and 600 may be implemented on one or more computing devices or environments, as described below. FIG. 7 depicts an example general purpose computing environment in which some of the techniques described herein may be embodied. The computing system environment 702 is only one example of a suitable computing environment and is not intended to suggest any limitation as to the scope of use or functionality of the presently disclosed subject matter. Neither should the computing environment 702 be interpreted as having any dependency or requirement relating to any one or combination of components illustrated in the example operating environment 702. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 702, which may include any of a mobile device or smart phone, tablet, laptop, desktop computer, etc., typically includes a variety of computer-readable media. Computer-readable media can be any available media that can be accessed by computer 702 and includes both volatile and nonvolatile media, removable and non-removable media. The system memory 722 includes computer-readable storage media in the form of volatile and/or nonvolatile memory such as read only memory (ROM) 723 and random access memory (RAM) 760. A basic input/output system 724 (BIOS), containing the basic routines that help to transfer information between elements within computer 702, such as during start-up, is typically stored in ROM 723. RAM 760 typically contains data and/or program modules that are immediately accessible to and/or presently being operated on by processing unit 759. By way of example, and not limitation, FIG. 7 illustrates operating system 725, application programs 726, other program modules 727, and program data 728.

The computer 702 may also include other removable/non-removable, volatile/nonvolatile computer storage media. By way of example only, FIG. 7 illustrates a hard disk drive 738 that reads from or writes to non-removable, nonvolatile magnetic media, a magnetic disk drive 739 that reads from or writes to a removable, nonvolatile magnetic disk 754, and an optical disk drive 704 that reads from or writes to a removable, nonvolatile optical disk 753 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 738 is typically connected to the system bus 721 through a non-removable memory interface such as interface 734, and magnetic disk drive 739 and optical disk drive 704 are typically connected to the system bus 721 by a removable memory interface, such as interface 735.

The drives and their associated computer storage media discussed above and illustrated in FIG. 7, provide storage of computer-readable instructions, data structures, program modules and other data for the computer 702. In FIG. 7, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 702 through input devices such as a keyboard 751 and pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). A monitor 742 or other type of display device is also connected to the system bus 721 via an interface, such as a video interface 732. In addition to the monitor, computers may also include other peripheral output devices such as speakers 744, printer 743, and/or image sensor(s) 770, which may be connected through an output peripheral interface 733.

The computer 702 may operate in a networked environment using logical connections to one or more remote computers, such as a remote computer 746. The remote computer 746 may be a personal computer, a server, a router, a network PC, a peer device or other common network node, and typically includes many or all of the elements described above relative to the computer 702, although only a memory storage device 747 has been illustrated in FIG. 7. The logical connections depicted in FIG. 7 include a local area network (LAN) 745 and a wide area network (WAN) 749, but may also include other networks. Such networking environments are commonplace in offices, enterprise-wide computer networks, intranets and the Internet.

When used in a LAN networking environment, the computer 702 is connected to the LAN 745 through a network interface or adapter 737. When used in a WAN networking environment, the computer 702 typically includes a modem 705 or other means for establishing communications over the WAN 749, such as the Internet. The modem 705, which may be internal or external, may be connected to the system bus 721 via the user input interface 736, or other appropriate mechanism. In a networked environment, program modules depicted relative to the computer 702, or portions thereof, may be stored in the remote memory storage device. By way of example, and not limitation, FIG. 7 illustrates remote application programs 748 as residing on memory device 747. It will be appreciated that the network connections shown are example and other means of establishing a communications link between the computers may be used.

In some aspects, other programs 727 may include an image fusion and enhancement application 765 that provides the functionality as described above. In some cases, image fusion and enhancement application 765 may execute processes 200, 300, 400, 500 and/or 600, and provide a user interface for manipulating images and/or setting automated image fusion parameters through graphics interface 731, video interface 732, output peripheral interface 733, and/or one or more monitors or touch screen devices 742.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for combining images to reduce motion blur in an output image, the method comprising:
   receiving data indicative of a first image and a second image of a scene;
   identifying, by a computing device, at least one portion of the first image associated with motion blur;
   comparing, by the computing device, the at least one portion of the first image to a corresponding second portion of the second image;
   selecting first pixels within the at least one portion of the first image and second pixels within the second portion of the second image not associated with motion blur;
   in response to determining that a tone map of the first image and a tone map of the second image are within a threshold similarity, combining the selected first pixels and second pixels into an output image; and
   sending the combined selected pixels for rendering on a display device.

2. The method of claim 1, wherein the selected first pixels and the selected second pixels do not correspond to a same pixel in the output image.

3. The method of claim 1, wherein selecting the first pixels and the second pixels further comprises:
   associating a first weight with at least one first pixel based on a degree of the identified motion blur;
   associating a second weight with at least one second pixel based on a second degree of the identified motion blur; and
   combining the at least one first pixel with the at least one second pixel based on the first weight and the second weight, wherein the at least one first pixel and the at least one second pixel correspond to a same pixel in the output image.

4. The method of claim 1, wherein comparing the at least one portion of the first image to the corresponding second portion of the second image further comprises generating a motion mask for the first image and the second image.

5. The method of claim 4, further comprising:
   adjusting at least one of the motion masks.

6. The method of claim 1, further comprising:
   selecting at least a third portion of the first image or the second image for inclusion in the output image based on at least one clarity metric, wherein the at least one third portion is not associated with motion blur.

7. A computing device comprising a processor and memory storing thereon computer-executable instructions that, when executed by the processor, cause the computing device to perform operations comprising:
   identifying at least one portion of a first captured image of a scene that is associated with motion blur;
   comparing the at least one portion of the first image to a corresponding second portion of a second captured image of the scene;
   selecting a first set of pixels within the at least one portion of the first image and a second set of pixels within the second portion of the second image, wherein the first and second set of pixels are not associated with motion blur;

based at least in part on a comparison of a tone map of the first image with a tone map of the second image, combining the first set of pixels and the second set of pixels into an output image; and rendering the combined pixels on a display device.

8. The computing device of claim 7, wherein the first set of pixels and the second set of pixels do not correspond to a same pixel in the output image.

9. The computing device of claim 7, wherein selecting the first set of pixels and the second set of pixels further comprises:

associating a first weight with at least one of the first set of pixels based on a degree of the identified motion blur;

associating a second weight with at least one of the second set of pixels based on a second degree of the identified motion blur; and combining the at least one first pixel with the at least one second pixel based on the first weight and the second weight.

10. The computing device of claim 9, wherein the at least one first pixel and the at least one second pixel correspond to a same pixel in the output image.

11. The computing device of claim 7, wherein comparing the at least one portion of the first image to the corresponding second portion of the second image further comprises generating a motion mask for the first image and the second image.

12. The computing device of claim 11, further comprising adjusting at least one of the motion masks.

13. The computing device of claim 7, further comprising selecting at least a third portion of the first image or the second image for inclusion in the output image based on at least one clarity metric, wherein the at least one third portion is not associated with motion blur.

14. A non-transitory computer-readable storage medium storing thereon computer-executable instructions that, when executed by a computing device, cause the computing device to perform operations comprising:

identifying at least one portion of a first captured image of a scene that is associated with motion blur;

comparing the at least one portion of the first image to a corresponding second portion of a second captured image of the scene;

selecting a first set of pixels within the at least one portion of the first image and a second set of pixels within the second portion of the second image, wherein the first and second set of pixels are not associated with motion blur;

combining the first set of pixels and the second set of pixels into an output image when a tone map of the first image and a tone map of the second image are within a threshold similarity; and storing the combined pixels.

15. The non-transitory computer-readable storage medium of claim 14, wherein the first set of pixels and the second set of pixels do not correspond to a same pixel in the output image.

16. The non-transitory computer-readable storage medium of claim 14, wherein selecting the first set of pixels and the second set of pixels further comprises:

associating a first weight with at least one of the first set of pixels based on a degree of the identified motion blur;

associating a second weight with at least one of the second set of pixels based on a second degree of the identified motion blur; and combining the at least one first pixel with the at least one second pixel based on the first weight and the second weight.

17. The method of claim 1, further comprising:

generating the first image tone map of the first image and a second image tone map of the second image; and comparing the first image tone map with the second image tone map.

18. The method of claim 17, wherein comparing the first image tone map with the second image tone map further comprises:

determining that at least one of the first image or the second image has an illumination level below an illumination threshold; and determining R, G, and B channels histograms of the first image and the second image if at least one of the first image and second image has the illumination level below the illumination threshold.

19. The method of claim 18, wherein the threshold similarity comprises a threshold difference between the R, G, and B channels histograms of the first image and the second image.

20. The method of claim 18, wherein the threshold similarity comprises a threshold difference between the R, G, and B channels histograms of the first image and the second image.

* * * * *